No. 800,080. PATENTED SEPT. 19, 1905.
A. W. CRAM.
TEA KETTLE COVER.
APPLICATION FILED JAN. 31, 1905.
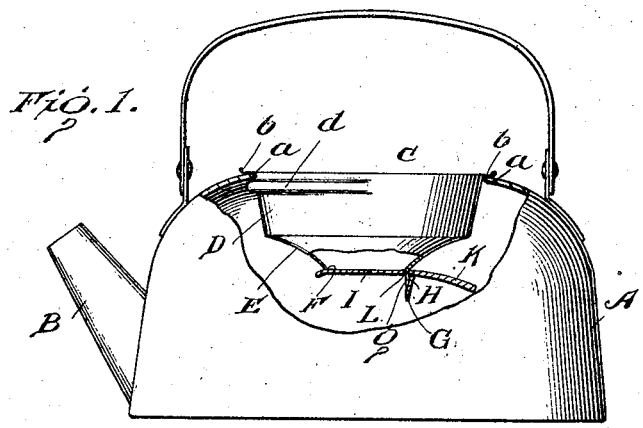
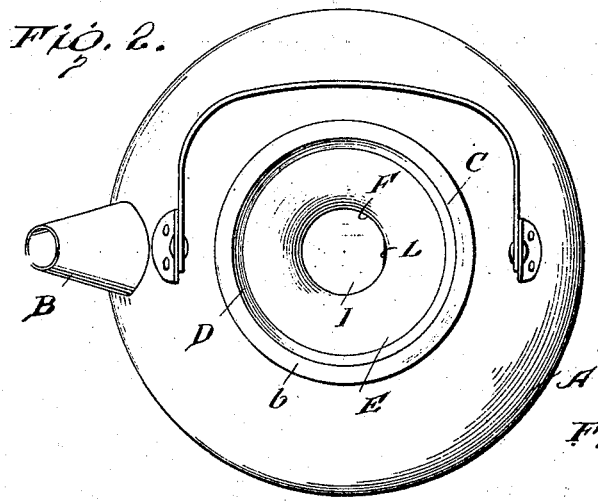
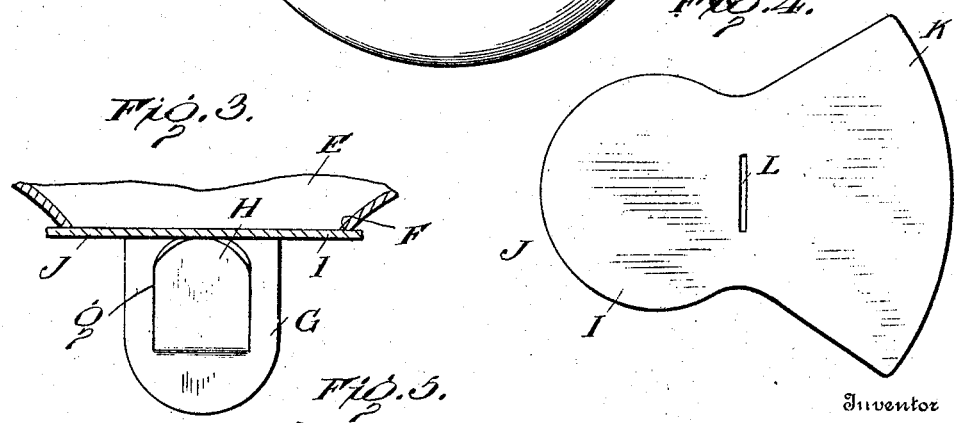
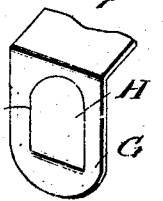
Witnesses
Inventor
A. W. Cram,
By A. S. Pattison,
Attorney

UNITED STATES PATENT OFFICE.

ALONZO WHEELER CRAM, OF HAVERHILL, MASSACHUSETTS.

TEA-KETTLE COVER.

No. 800,080.  Specification of Letters Patent.  Patented Sept. 19, 1905.

Application filed January 31, 1905. Serial No. 243,484.

*To all whom it may concern:*

Be it known that I, ALONZO WHEELER CRAM, a citizen of the United States, residing at Haverhill, in the county of Essex and State of Massachusetts, have invented certain new and useful Improvements in Tea-Kettle Covers, of which the following is a specification, reference being had therein to the accompanying drawings.

My invention relates to improvements in tea-kettle covers.

The object of my invention is to provide a cover for a tea-kettle which is provided with a swinging valve or bottom which is normally held closed and adapted to be automatically opened by the weight of the water thereon, so that the kettle can be readily filled without removing the cover.

Another object of my invention is to provide a cover of this character in which the cover rests loosely on or within the kettle and is provided with means for preventing the cover from sliding from the kettle when the same is tilted for pouring water therefrom, and yet the same may be readily removed or placed thereon.

A still further object of my invention is to provide a device of this character in which all parts are made of sheet metal and the parts interlocked in order to avoid the use of screws and rivets, thus decreasing the cost of the same.

In the accompanying drawings, Figure 1 is a side elevation of a tea-kettle, showing the side thereof broken away with my device applied thereto. Fig. 2 is a top plan view of Fig. 1. Fig. 3 is a vertical sectional view taken on line $x\ x$ of Fig. 2. Fig. 4 is a top plan view of the swinging gate or valve. Fig. 5 is an enlarged perspective view of the downwardly-extending member carried by the cover upon which the swinging gate or valve is supported.

Referring now to the drawings, A represents the kettle, which may be of any desired curvature or shape, but preferably of the form shown, and that is with the contracted upper end forming a comparatively small opening therein and the usual spout B for pouring the water therefrom. The cover C is of dish shape and slightly smaller than the opening in the kettle and provided with outwardly-extending flange $b$, extending over the edge $a$ of the opening and resting upon the same, whereby the cover is supported within the opening in the kettle. The forward edge of the downwardly-extending wall D of the cover is provided with an inwardly-extending beading $d$, which is preferably pressed therefrom and extends slightly less than half-way around the same and is adapted to extend under the edge $a$ of the kettle and prevent the cover from sliding off when the kettle is tilted for pouring water therefrom. The wall D is of such diameter that the same will enter the opening in the kettle and allow the beading $d$ to also pass the edge $a$, and thus the cover has a slight movement within the kettle. The tilting of the kettle causes the cover to slide forward. Thus the beading $d$ engages the under side of the ledge $a$ and the cover is prevented from sliding from the kettle. The said cover C has a lower contracted bottom E, which is provided with a circular opening F cut therein during the stamping process of the cover, as it will be understood that the cover is made as a separate and independent part of the kettle and is sold as such.

When the opening F is cut therein, the rear face of the contracted bottom is left with an inwardly-extending tongue G, which is formed with an inverted-U-shaped cut or slot $g$ therein, forming a tongue H, the purpose of which I will now proceed to describe. The said tongue G is bent downward, as shown in Figs. 1 and 3, in a vertical position, and the swinging valve or gate I is swingingly connected thereto. The said gate is composed of a flat piece of sheet metal stamped with a circular portion J, corresponding in shape to the opening in the cover and of a diameter slightly greater, so that the same will not pass upwardly therethrough. The same gate is formed with a rearwardly-extending wing portion K, which is of a size considerably greater than the rounded portion, so that the weight thereof will overbalance the same. The said gate is provided with an elongated slot L, which is of a length equal to the width of the tongue G and through which the tongue passes, and the tongue H is then bent outward to engage the under side of the gate and prevent the same from sliding therefrom, and thus the gate is swingingly connected thereto.

The portion K being larger than that of J, it will necessarily be heavier, and the same being bent slightly downward will serve as a weight for normally holding the circular portion J, closing the opening F in the cover, and prevent the passage of the steam from the kettle. In order to fill the kettle, the water is simply poured into the cover, and the weight of the water on the portion J overbalances that of the portion K and causes the same to swing downward, thus allowing the water to enter the kettle through the opening.

Having thus described my invention, what I claim, and desire to secure by Letters Patent, is—

1. An article of manufacture comprising a cover having an opening in its bottom, a downwardly-extending tongue adjacent said opening, and a gate having a slot through which the tongue passes, and by means of which the gate is swingingly supported.

2. An article of manufacture comprising a cover having an opening in its bottom, a downwardly-extending tongue adjacent said opening, a gate having a slot through which the tongue passes, and an outwardly-projecting member carried by the tongue below the gate for supporting the same.

3. An article of manufacture comprising a cover having an opening in its bottom, a downwardly-extending tongue adjacent said opening, a gate having a slot through which the tongue passes, and a second tongue cut out of the first tongue and bent outwardly therefrom below the gate and swingingly supporting the same.

4. An article of manufacture comprising a cover having an opening in its bottom, a downwardly-extending tongue stamped from said opening, an elongated gate having an opening therein through which said tongue passes, means for preventing the gate from passing from the tongue, and one end of said gate normally closing the opening in the cover, and the opposite end serving as a weight for holding the same in said position.

5. An article of manufacture comprising a cover, having an opening in its bottom, a downwardly-extending tongue stamped from the metal of said opening, an elongated gate having an opening nearer one end than the other, and through which said tongue passes, a second tongue stamped from the first tongue and extending out and swingingly supporting the gate, and the inner short end of said gate adapted to close the opening in the cover and the opposite end forming a weight for holding the same in said position.

In testimony whereof I affix my signature in presence of two witnesses.

ALONZO WHEELER CRAM.

Witnesses:
 W. W. DOWNS,
 BRADFORD PATTEN.